Patented Oct. 25, 1932

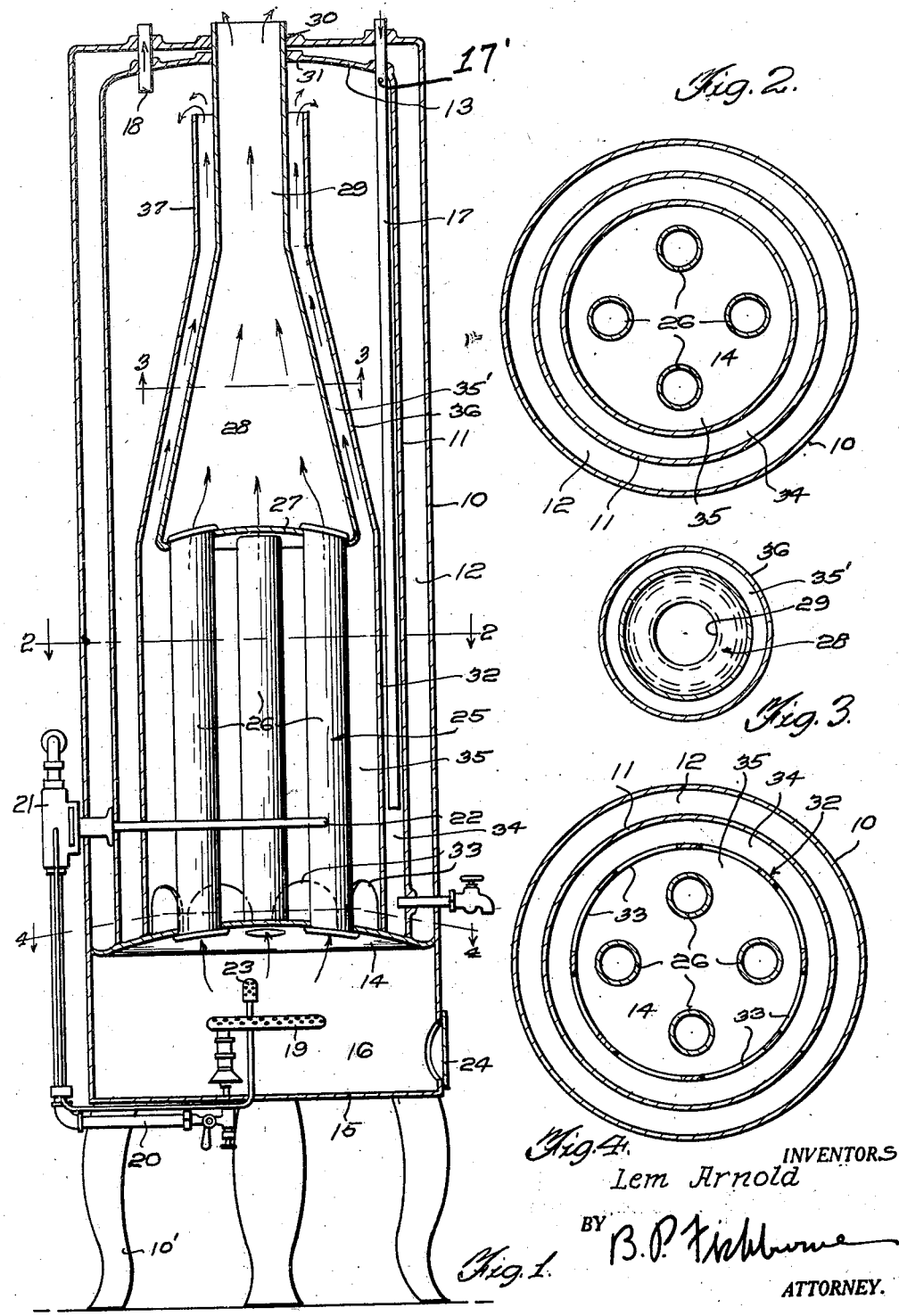

1,885,040

UNITED STATES PATENT OFFICE

LEM ARNOLD, OF SAN ANGELO, TEXAS

WATER HEATER

Application filed June 23, 1931. Serial No. 546,340.

My invention relates to improvements in automatic water heaters of the storage type.

In accordance with my invention, I provide an automatic water heater of the storage type, so constructed that the temperature of the stored water is heated to the desired hot temperature quicker than is possible with other heaters of the general type. The heater has a high efficiency in heat transfer and a low gas consumption. The construction of the flue assembly is such that the expansion and contraction of the flues, incident to heating, is evenly distributed against several points of the boiler heads, instead of against one point, at the top or bottom, thereby eliminating liability of leakage. The heater is so constructed that the heated gases or products of combustion are divided and passed through several flues, preventing any one flue from becoming overheated, as would probably occur if all of the products of combustion were passed through one flue. The heater is so constructed that flue winds are eliminated, which tend to extinguish the pilot flame. The heated products of combustion, when passing through portions of the heater, are subjected to a baffling action, forming an eddy in the traveling products of combustion, slowing down their travel, thereby increasing the time of heat exchange between the products of combustion and the water. The heater has a large water heating surface, for effecting efficient heat exchange without the employment of water discs, water coils, or other auxiliary heating units, all of which are susceptible to stoppage from mineral precipitated from the water, and from scale formations caused by oxidation of the iron. The heater has a free circulation of water, preventing local over-heating of the water, as is frequently caused by small circulating passages, thus further eliminating the formation of solid matter which would tend to clog the circulating passage.

In the accompanying drawing, forming a part of this specification, and in which like numerals are employed to designate corresponding parts throughout the same, Figure 1 is a central vertical longitudinal section through an automatic water heater embodying my invention, Figure 2 is a horizontal section taken on line 2—2 of Figure 1, Figure 3 is a similar view taken on line 3—3 of Figure 1, and Figure 4 is a similar view taken on line 4—4 of Figure 1.

In the drawing, wherein for the purpose of illustration is shown a preferred embodiment of my invention, the numeral 10 designates an outer substantially cylindrical vertical casing, which may advantageously be formed of galvanized iron. This outer casing is supported by legs 10', or the like. Extending longitudinally within this casing is a water holding tank 11, also preferably cylindrical and spaced from the outer casing 10, affording an air space 12. The water holding or storage tank 11 is, preferably, formed of galvanized iron. The tank 11 is provided with top and bottom heads 13 and 14, which are spherically curved and have their upper surfaces convex. The bottom head 14 extends beyond the tank 11, and is attached to the outer casing 10 by welding, or the like, for affording a tight joint. The top head 13 is spaced from the top of the outer casing 10 and the bottom head 14 is spaced from the bottom 15 of the casing 10, affording a combustion chamber 16, as shown.

The numeral 17 designates a water supply pipe, having an air vent 17' and extending downwardly through an opening formed in the top of the outer casing 10 and through an opening formed in the top head 13, the pipe 17 extending downwardly throughout the major portion of the length of the vertical tank 11, and terminating with its outlet end at an elevation near and spaced from the bottom head 14. The numeral 18 designates a water outlet pipe, extending through an opening formed in the top of the outer casing 10, and through an opening formed in the top head 13, and having its intake end terminating at an elevation near and below the top head, as shown.

Arranged within the combustion chamber 16 is a gas burner 19, of any well known or preferred type, and this burner receives gas from a pipe 20, connected with an automatic thermostatic valve device 21, having a thermostat element 22, which is arranged within the tank 11, as shown.

The numeral 23 designates a pilot light element. The burner and thermostatic control is of the usual construction, and the pilot light 22 burns continuously while the burner 19 burns until the temperature of the water within the tank 11 reaches the desired degree, at which time, the thermostatic device 21 automatically cuts off the gas from the burner 19, again turning on the gas when the temperature of the water drops below the selected degree, thereby maintaining the temperature of the water substantially constant during the operation of the heater.

The casing 10 is provided at the combustion chamber with an opening adapted to be covered by a door 24, whereby access may be had to the interior of the combustion chamber to light the pilot light element 23.

The numeral 25 designates a flue heating unit, embodying a plurality of vertical flues 26, mounted at their lower ends in the bottom head 14, and having their lower open ends in communication with the combustion chamber 16. The vertical flues 26 have their upper ends attached to an upper head or plate 27, preferably cylindrically curved, with its upper surface convex. The upper open ends of the flues 25 discharge above the head 27, as shown.

Arranged above the head 27 is a heat chamber 28, the lower end of which is welded or otherwise attached to the head 27 to form a water-tight joint therewith. The products of combustion from the flues 25 discharge into this heat chamber. The heat chamber is circular in horizontal cross-section and is longitudinally tapered and decreases in diameter upwardly, and leads at its upper reduced end into a cylindrical vent pipe 29, rigidly secured thereto, and this vent pipe passes through openings 30 and 31, formed centrally within the top of the casing 10 and the top head 13, as shown. The vent pipe 29 discharges at its upper end exteriorly of the casing 10, as shown.

Arranged in spaced concentric relation between the tank 11, and the group of flues 25, is a water circulating jacket 32, having a lower cylindrical portion corresponding in length to the flues 25. This jacket is provided at its lower end with water circulating openings 33, serving to establish communication between outer and inner water circulating passages 34 and 35. The jacket 32 has its lower end attached to the bottom head 14 by spot welding, or the like. The jacket includes an upper portion 36, which is circular in cross-section, and arranged in spaced concentric relation between the tank 14 and the heat chamber 28. The upper portion 36 of the jacket is circular in cross-section and is longitudinally tapered and decreases in diameter upwardly, terminating in a reduced cylindrical portion 37, surrounding the vent pipe 29 in spaced concentric relation, and having its upper outlet end terminating at an elevation beneath and spaced from the top head 13.

The operation of the heater is as follows:

When the burner 19 is in operation, the heated gases or products of combustion from the combustion chamber 16, travel upwardly therefrom and enter the flues 25, passing upwardly through these flues and discharging into the lower large end of the upwardly tapering heat chamber 28, and finally passing through the vent pipe 29, to the atmosphere. As the heated gases or products of combustion pass through the upwardly tapering chamber 28, they are subjected to a retarding or baffling action, to some extent, whereby their travel is retarded or slowed down, prolonging the period within which they travel through the heat chamber. This aids in effecting a high degree of heat exchange with the water, as will be explained. Further, the eddying or baffling of the heated gases or products of combustion within the upwardly tapering heat chamber 28 serves to prevent flue winds, which would tend to extinguish the pilot light. The tank 11, being completely filled with water, at all times, the water within the lower portion of the tank coming in direct contact with the flues 25, is heated thereby, and is guided by the water circulating jacket 26, so that it passes upwardly within this jacket, traveling upwardly through the passage extension 35′, and finally discharging back into the top of the tank 11, exteriorly of the jacket 32, and as this heated water tends to cool, it will descend exteriorly of the jacket 32, and again pass through openings 33 to the interior of the jacket, and again pass upwardly through the jacket to complete the cycle of circulation. The water passing through the passage extension 35′, arranged between the tapered heat chamber 28, and jacket section 36, is subjected to an eddying or baffling action, to some extent, thereby retarding the travel of the water and effecting a more complete heat exchange with the hot gases. As the water is withdrawn from the tank 11, it is automatically replenished through pipe 17, and is, hence, introduced into the tank 11 near its bottom, so that this cold water will travel downwardly and pass through the openings 36 and enter the circulating jacket 32, to again travel upwardly therein.

It is to be understood that the form of my invention herewith shown and described, is to be taken as a preferred example of the same, and that various changes in the shape, size and arrangement of parts, may be resorted to without departing from the spirit of the invention, or the scope of the subjoined claim.

Having thus described my invention, what I claim is:

A domestic water heater comprising a vertical cylindrical casing, a vertical cylindrical water holding tank disposed within the casing in spaced relation for affording a space between the same, said tank having top and bottom heads, said casing extending downwardly beyond the tank for forming a combustion chamber, a plurality of spaced flues arranged within the water holding tank and attached to the bottom head and in communication with the combustion chamber, a heat chamber arranged within the tank above the flues and having a head attached to the flues, said flues discharging into the heat chamber, said heat chamber being vertically disposed and tapering upwardly, said heat chamber and said flues being generally of the same length, and the combined length of the heat chamber and flues extending throughout the major portion of the length of the water holding tank, discharge means for the heat chamber leading to the exterior of the water holding tank, a water circulating jacket extending longitudinally within the water holding tank and spaced from the tank and from the flues and heat chamber, said water circulating jacket including a lower cylindrical portion of substantially the same length as the flues and an upwardly tapering portion of substantially the same length as the heat chamber, the upper end of the jacket discharging into the water holding tank adjacent to its upper end, means for introducing water into the lower end of the tank, means for withdrawing water from the upper end of the tank, and a burner arranged within the combustion chamber.

In testimony whereof I affix my signature.

LEM ARNOLD.